Oct. 2, 1962  I. M. DAVIDSON  3,056,566
JET PROPELLED AIRCRAFT
Filed Feb. 8, 1960  5 Sheets-Sheet 1

Ivor Macaulay Davidson
Inventor
By Stevens Davis Miller
 r Mosher
Attorneys

Oct. 2, 1962     I. M. DAVIDSON     3,056,566

JET PROPELLED AIRCRAFT

Filed Feb. 8, 1960     5 Sheets-Sheet 2

Ivor Macaulay Davidson
*Inventor*

By Stevens, Davis, Miller & Mosher
Attorneys

Oct. 2, 1962   I. M. DAVIDSON   3,056,566
JET PROPELLED AIRCRAFT
Filed Feb. 8, 1960   5 Sheets-Sheet 3

Ivor Macauley Davidson
Inventor
By Stevens, Davis, Miller
 & Mosher
Attorneys

Oct. 2, 1962   I. M. DAVIDSON   3,056,566
JET PROPELLED AIRCRAFT
Filed Feb. 8, 1960   5 Sheets-Sheet 4

Inventor
IVOR MacAULAY DAVIDSON
By
Stevens, David, Miller & Mosher
Attorneys

Oct. 2, 1962  I. M. DAVIDSON  3,056,566
JET PROPELLED AIRCRAFT
Filed Feb. 8, 1960  5 Sheets-Sheet 5

Ivor Macaulay Davidson
*Inventor*
By Stevens Davis Miller & Mosher
*Attorneys*

United States Patent Office 3,056,566
Patented Oct. 2, 1962

3,056,566
JET PROPELLED AIRCRAFT
Ivor Macaulay Davidson, Farnborough, England, assignor to Power Jets (Research and Development) Limited, London, England, a British company
Filed Feb. 8, 1960, Ser. No. 7,305
Claims priority, application Great Britain Feb. 17, 1959
17 Claims. (Cl. 244—15)

The present invention is concerned with aircraft having provision for increasing the aerodynamic wing lift by circulation control, that is, by modification of the pressure distribution around the wing. In general, the term "wing" herein extends to include any lifting surface, and in particular to the foreplane of an aircraft of Canard or "tail-first" configuration.

One application of the invention is to aircraft operating on the "jet flap" principle. Examples of jet flap aircraft are disclosed in United States Patents Nos. 2,961,192; 2,977,068; 2,978,204; 2,973,165; 2,978,207; 2,973,922; and 2,756,008, and the principles involved are discussed in a paper by the present inventor published in the Journal of the Royal Aeronautical Society, January 1956.

Since in a jet flap aircraft the propulsive jet stream is effective to give rise not only to forward thrust but also to lift on the aircraft, the consequences of engine failure could be very serious, especially on take-off and landing. Many prior proposals for jet flap aircraft have therefore involved the use of a large number of relatively small engines so that the failure of a single engine would have only a minor effect on the thrust and lift. Such engines would however almost inevitably have to be distributed along the wing span and this would involve serious installation and engine maintenance problems. One object of the present invention is therefore the provision of an engine installation for a jet flap aircraft having only a conventional number of, for example, four, engines.

The invention also has application to aircraft employing other methods of circulation control, in particular, that of copending United States patent application Serial No. 118,327.

According to the invention, an aircraft is powered by a plurality of gas turbine jet propulsion engines of the by-pass type connected to discharge their turbine exhaust streams clear of the wings through rearwardly directed jet propulsion nozzles and to supply at least part of their by-pass air streams through non-return valves to a common duct, the duct being connected to discharge the air as long thin streams extending along the span of the wings.

According to a feature of the invention, provision is made for varying the flow area available for the discharge of the by-pass streams of the engines relative to the flow area available for the discharge of the remainder of the efflux of the engines. More specifically, the flow area available for the discharge of the by-pass streams is variable between a value matched to operation of all the engines at the design by-pass ratio and a lower value matched to operation of one less than the total number of engines at the design by-pass ratio.

By adjustment of the flow area available for discharge of the by-pass streams, it is possible to so arrange matters that in the event of failure of one of the engines on take-off, the remaining engines will adjust themselves to the changed conditions without the necessity for any adjustment, i.e. of engine speed or jet nozzle area, on the part of the pilot.

The invention will be more fully described by way of example with reference to the accompanying diagrammatic drawings, of which:

Figure 1:
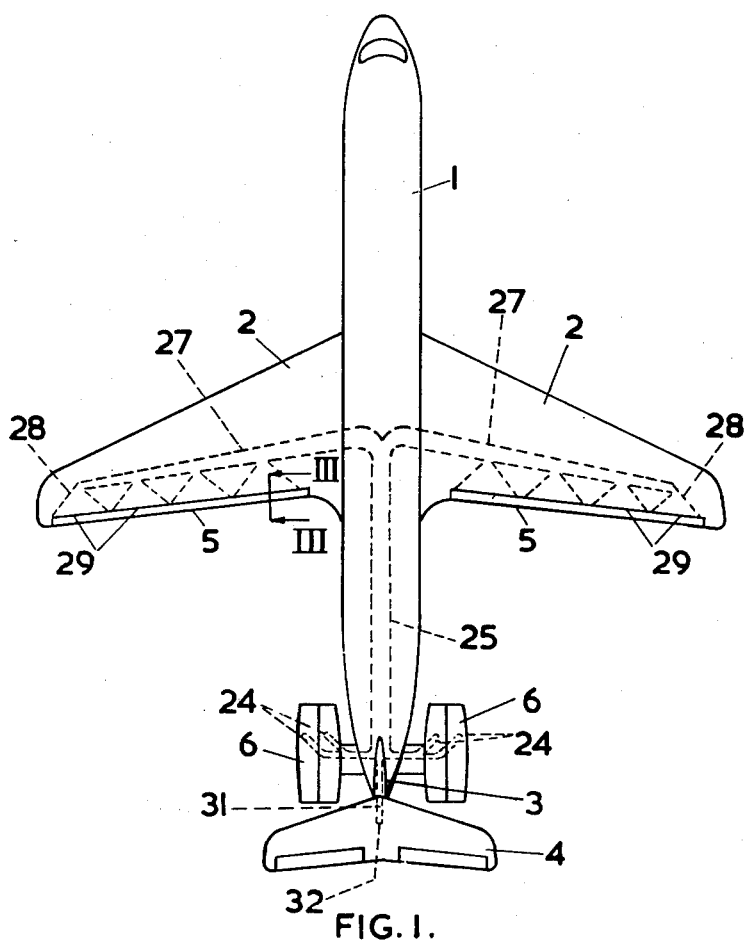
FIGURE 1 is a plan view of a "jet flap" aircraft embodying the present invention.

The aircraft of FIGURE 1 comprises a fuselage 1, a pair of opposite wings 2 and a tail unit including the usual fin and rudder 3, and tailplane and elevators 4. Each wing 2 has a small trailing edge wing flap 5 extending preferably along a major part of its span and possibly along substantially the whole wing span, i.e. as nearly as possible from root to tip consistent with structural requirements. The aircraft is powered by four gas turbine jet propulsion engines 6 mounted in pods at the tail of the aircraft, two on each side of the fuselage.

Figure 2:
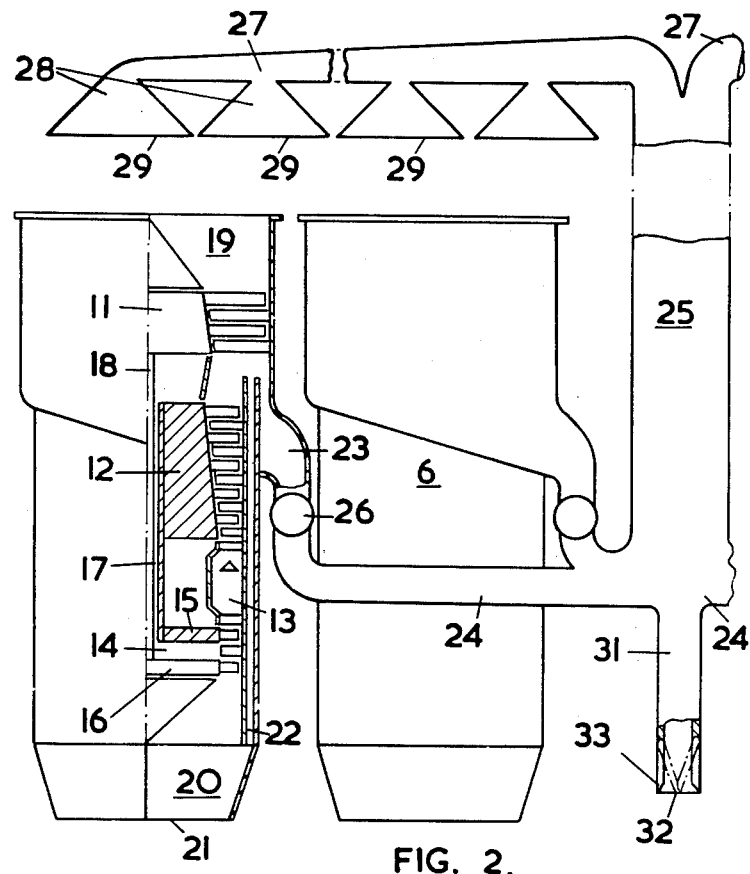
FIGURE 2 is a schematic view of the engines, the jet nozzles and the associated ducting system of the aircraft of FIGURE 1.

As shown in FIGURE 2, each engine 6 is of the two-spool by-pass type and comprises a low pressure or by-pass compressor 11, a high pressure compressor 12, a combustion system 13 and a turbine assembly 14 mounted in that order from front to rear of the engine, the turbine assembly including two mechanically independent rotors 15, 16 connected to drive the compressor rotors by means of coaxial shafts 17, 18. The low pressure compressor 11 is connected to draw in air from atmosphere through an inlet 19 at the forward end of the enclosing pod while the outlet therefrom is divided radially into two co-axial annular passages, the inner passage being connected to the inlet of the high pressure compressor 12 which is in turn connected to the combustion system inlet. The combustion system is connected to discharge the combustion gases through the turbine into a jet pipe 20 leading to a jet propulsion nozzle 21 at the rearward end of the pod for the rearward discharge of a propulsive jet stream. This nozzle (hereinafter referred to as a main nozzle) is of conventional form, that is, it is generally circular in shape in contrast to the elongated "jet flap" nozzles referred to below, and it is arranged to discharge clear of the wings and other parts of the aircraft.

Figure 3:
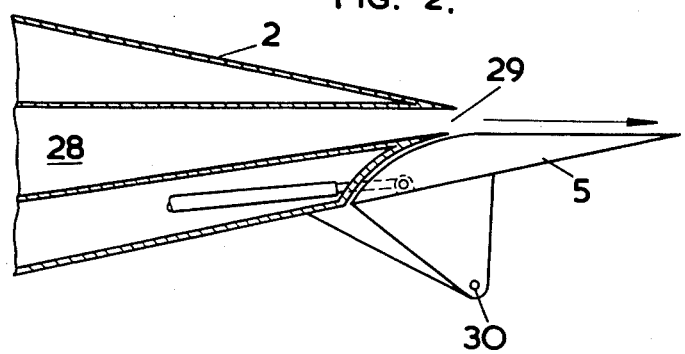
FIGURE 3 is a fore-and-aft sectional view on the line III—III through the rear part of the aircraft wing.

It is the usual practice in by-pass engines for the outer passage at the by-pass compressor outlet to be connected to an annular by-pass duct surrounding the high pressure compressor, combustion system and turbine assembly through which part of the air from the by-pass compressor is led to be discharged as a propulsive jet stream coaxially surrounding or mixed with the stream of turbine exhaust gases. In the present invention however only part of the by-pass stream of each engine is discharged with the turbine exhaust gases. Thus the aforesaid outer passage at the outlet from the by-pass compressor 11 of each engine is sub-divided into two coaxial annular passages, the inner of the two opening into a by-pass duct 22 as aforesaid leading at its down-stream end into the jet pipe 20. The outer of the two passages is connected through a volute 23 or the like and a conduit 24 to a duct 25 extending along the length of the fuselage (see also FIGURE 1), this duct being common to the four engines so that the by-pass air streams of the four engines are pooled therein. The conduit 24 from each engine to the duct 25 includes a non-return valve 26 for preventing reverse flow to the engine. The non-return valve can consist of a pair of flaps lying along the stream, and hinged together at their upstream edges and spring-loaded so that they will spread out and close the connection should any flow reversal occur. The common duct is connected at its forward end to manifolds 27 extending spanwise within the wings 2 and the manifolds are in turn connected through appropriately shaped branch pipes 28 to long shallow rearwardly directed jet nozzles 29 extending along the span of the wing. The nozzles in each wing are substantially contiguous at their ends and are arranged and extend along each wing to such an extent that the pooled by-pass air streams are discharged over the upper surfaces of the wing flaps 5 as long thin spanwise-extending jet sheets (see FIGURE 3). These sheets act as "jet flaps" which operate to modify the aerodynamic pressure distribution around the wing and increase the wing lift in accordance with principles already referred to, and by turning the flaps about their pivotal axes 30, the jet sheets can be deflected upwardly and downwardly and control of the aircraft effected. The nozzles 29 will hereinafter be referred to as the jet flap nozzles.

The duct 25 has a further branch 31 from its rearward end which terminates in a small rearwardly directed auxiliary nozzle 32 at the rearward extremity of the fuselage (see FIGURE 1). This nozzle can be closed by means of flaps 33 as indicated in broken lines, or by any equivalent means.

The operation of the invention will now be described. It is to be noted first that only about a quarter to a third of the propulsive effort of the engines goes into the air stream supplied to the jet flap nozzles 29 and auxiliary nozzle 32. For example, in the case of engines of a by-pass ratio of 2, about half the by-pass air stream may be supplied to the duct 25. Also, the flow area afforded by the jet flap nozzles 29 together with the auxiliary nozzle 32 is matched (as nearly as is practical) to operation of the four engines at the design by-pass ratio, while the flow area of the jet flap nozzles 29 alone is likewise matched to operation of three engines only at the design by-pass ratio. Ideally, this means that the total flow area of the jet flap nozzles 29 is three times the flow area of the auxiliary nozzle, and in general, if the number of engines is $n$, the areas of the jet flap nozzles and the auxiliary nozzle are related in the ratio $n-1:1$. In practice there must in any case be some departure from this ideal ratio to allow for losses in the ducting leading to the nozzles. Other departures from the ideal are discussed below.

Under normal flying conditions, the auxiliary nozzle 32 is fully open, and the engines will be operating at their design by-pass ratio with maximum efficiency. For take-off however the auxiliary nozzle is closed, and the resultant increase in back-pressure on the by-pass compressors gives rise to a change in the by-pass ratio of the engines, whereby the mass flow through the high pressure compressor, combustion system and turbine of each engine is increased. It will be understood that a by-pass engine of the two-spool type described is sufficiently flexible to permit such a change so that the engines will still be matched to the reduced effective nozzle area even though operation at a somewhat inferior performance will result. The resulting thrust loss will however be relatively small, say, of the order of 5%.

Should an engine fail on take-off, the inherent flexibility of the engines will result in an immediate automatic readjustment of their by-pass ratios, and since the total nozzle area then available is matched to three engines only, the by-pass ratios will in fact readjust themselves to their design value. The engines will then be operating at maximum efficiency, the thrust being 75% of the total thrust of the four engines when operating at the design point, or, say, $$\frac{75}{95} \times 100$$

i.e. 79%, of the thrust available before the engine failure occurred.

It will be seen therefore that, in the event of engine failure at take-off, the engines will readjust themselves to the changed conditions without any action on the part of the pilot. The angle of climb will be reduced, but the three-engine performance of the aircraft will of course be chosen to comply to the minimum requirements in this respect as is the case in conventional aircraft.

The above-described advantage is obtained at the expense of a small reduction of efficiency at take-off with four engines, but such a loss can be tolerated as it arises during only a relatively small proportion of the flying time of the aircraft. When the aircraft reaches a safe altitude, the auxiliary nozzle is opened so that the engines can readjust themselves to operation at their design by-pass ratio with maximum efficiency.

On landing similar considerations apply. The auxiliary nozzle is closed and the four engines throttled back to give a thrust slightly less than the maximum thrust afforded by three engines only. Should one engine fail, the remaining three engines will readjust themselves automatically, and thrust and lift can be restored by opening the throttles. A small margin of thrust is still left to enable the aircraft to climb away in the event of a baulked landing.

Figure 4:
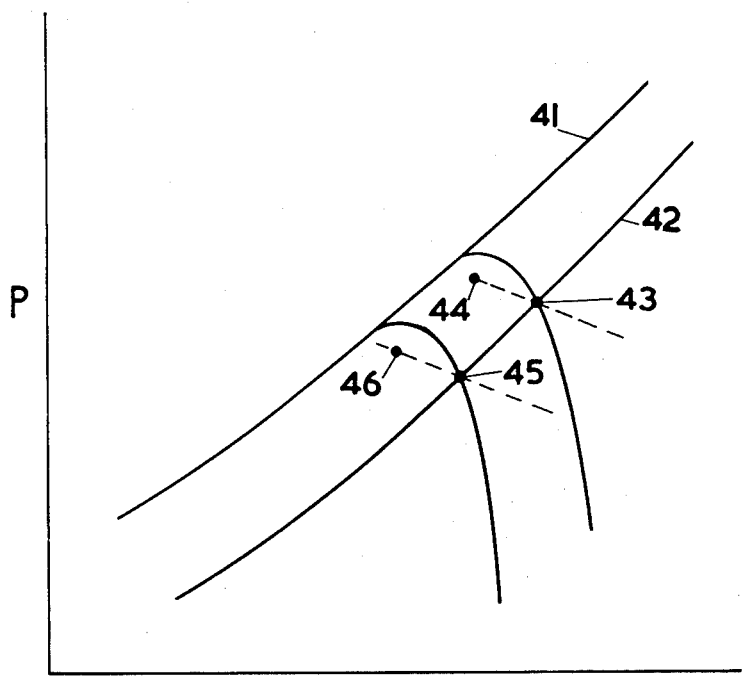
FIGURE 4 is a characteristic diagram for the by-pass compressors of the engines.
Figure 8:
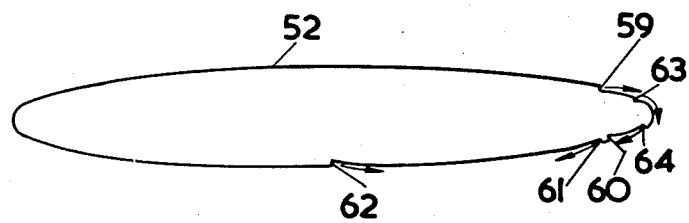
FIGURE 8 is a fore-and-aft sectional view on the line VIII—VIII through the wing of the aircraft of FIGURE 7.

The effect of the above-described sequence of operations on the by-pass compressor can be seen in the compressor characteristic diagram of FIGURE 4 which shows by-pass compressor pressure ratio P plotted against mass flow Q. In this diagram the compressor surge line is shown at 41 and the normal operating line at 42. It is assumed that at maximum output (corresponding to aircraft take-off), operation with the auxiliary nozzle open would be at the design point 43. Closing the auxiliary nozzle results in operation at point 44 at a slightly lower efficiency, while if one engine then fails operation is again at the design point with maximum efficiency. It will be noted that under these conditions the operating point moves away from the surge line.

For landing the compressor rotational speed will be lower and operation would be at point 45 on the operating line if the auxiliary nozzle were open, and with the nozzle closed, is in fact at point 46. Should an engine fail, the engines will readjust themselves to operation at point 45 and opening the throttles to restore thrust brings the operating point up to the design point 43.

It is found that with either three or four engines operating, the high pressure compressor continues to operate along the same operating line.

It is to be noted that to achieve the results described above, the use of by-pass engines of the two-spool type described is practically essential. Since the by-pass and high pressure compressors are rotatable mechanically independently of one another, their rotational speeds can vary relative to one another to give the required flexibility of operation.

In some cases, the use of the ideal nozzle area ratio discussed above may involve bringing the by-pass compressor operating point dangerously near the surge line when the auxiliary nozzle is closed. It may therefore be necessary to have an auxiliary nozzle of somewhat smaller area than that corresponding to the ideal ratio. In such an arrangement engine failure on take-off or landing would lead to operation of the by-pass compressor, not at the design point 43, but at a point on the opposite side of operating line 42 to point 44 and the efficiency would be somewhat less than the maximum.

It will be apparent that the operation of the invention depends upon a variation of the effective flow area available for the discharge of the by-pass air stream relative to the flow area available for the discharge of the turbine exhaust gas stream. The effect can be achieved in other ways. In one alternative, shown in FIG. 5, the auxiliary nozzle is dispensed with, and the engine jet nozzles 21 are of variable area. Constriction of the jet stream is effected by external constricting members 35 of the known "clam-shell" type which have the effect of reducing the effective flow area available for the discharge of the by-pass stream. Thus if the flow area of the jet flap nozzles and the main nozzles in their fully open setting matches the four engines while the flow area of the jet flap nozzles and the main nozzles in their reduced area setting matches three engines an automatic readjustment of the engine operating conditions as described above can be effected. It will of course be necessary to link the constricting members of the four jet nozzles so that they can be operated in unison. Thus the actuators 36 of the constricting members are linked as indicated at 37.

Figure 6:
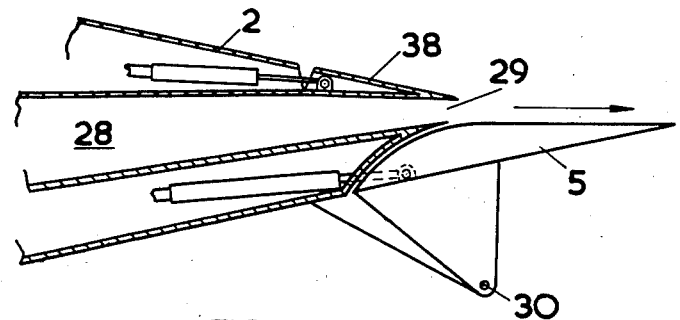
FIGURE 6 is a view corresponding to that of FIGURE 3 of a further alternative embodiment.
Figure 7:
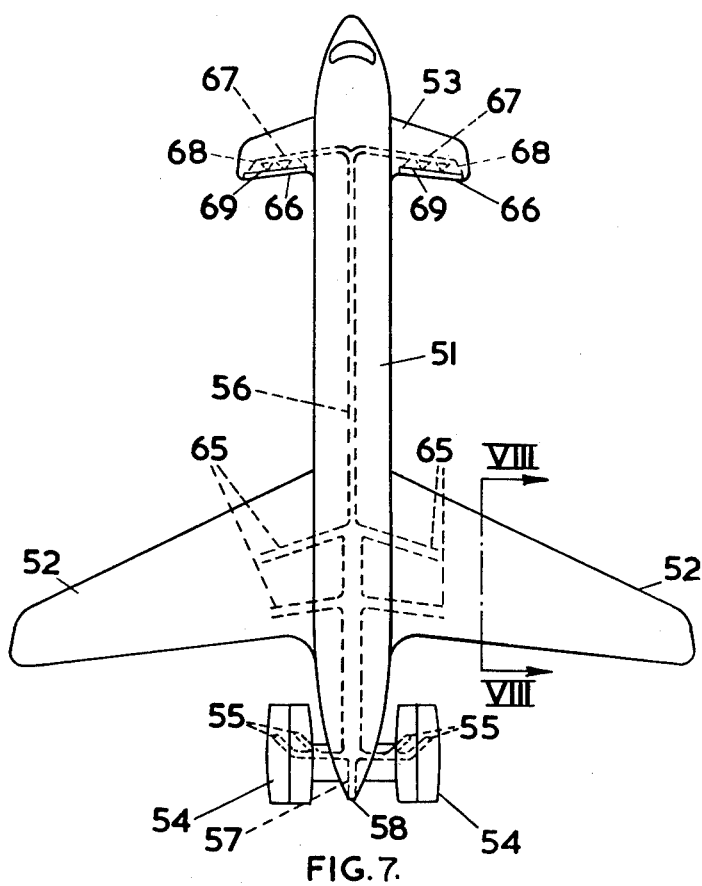
FIGURE 7 is a view corresponding to FIGURE 1 of another embodiment of the invention.

In yet another alternative the auxiliary nozzle is dispensed with and provision is made for varying the area of the jet flap nozzles 29 themselves, by forming the upper edge of the nozzles as a pivoted flap as shown in FIGURE 6 which is similar to FIGURE 7 of United States Patent No. 2,973,165.

As in the prior specifications referred to above, the wing flaps 5 are as of small chord as possible, preferably not more than 10% and possibly as little as 2 to 5% of the total local wind chord. The flap size will preferably be the minimum necessary to effect deflection of the jet sheet, and to this end it would appear that radius of the forward curved part of the flap upper surface should not be less than about 5 times the nozzle depth. However in the present invention the jet flap nozzles 29 have to pass only a portion of the engine efflux, so the flap size may be correspondingly reduced and a very small flap should be possible.

Although in the above described embodiment four engines are used, it is considered that it would be possible to allow for engine failure with only three engines. However the thrust afforded by three engines of reasonable size might not be sufficient to propel the aircraft. A greater number of engines than four would of course also be possible, but with aircraft and engines of present day standards, four engines is thought to be the optimum.

Figure 5:
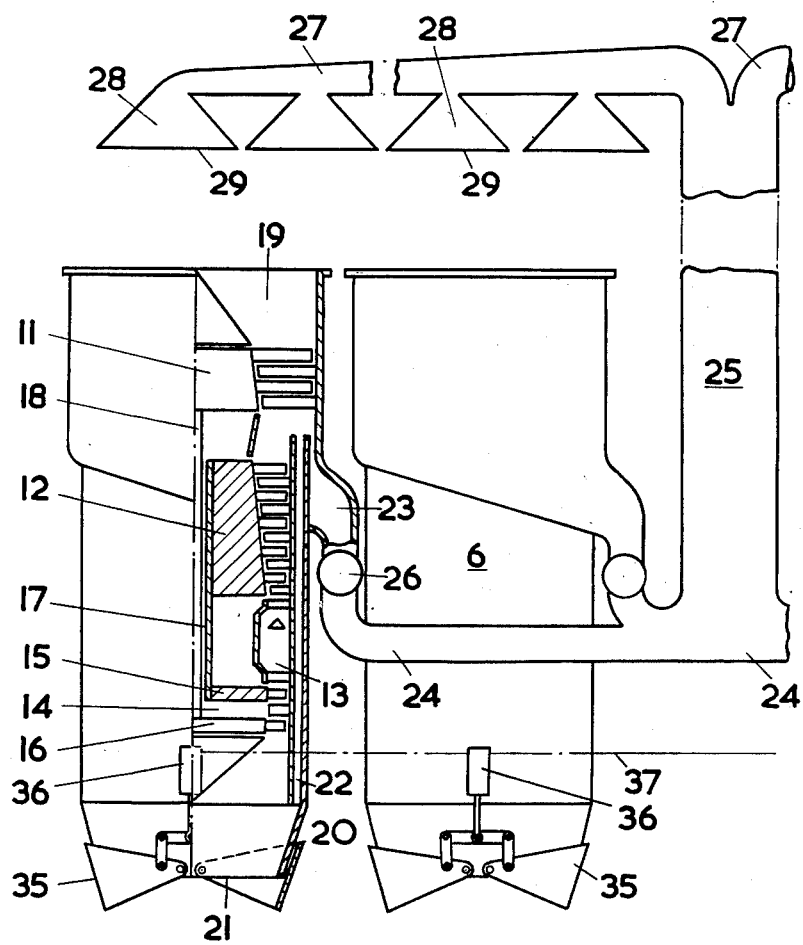
FIGURE 5 is a schematic view, corresponding to that of FIGURE 2, of an alternative embodiment.

In FIGURES 5 and 6, there is shown an application of the invention to an aircraft in which the lift on the wings is induced by circulation control in the manner described in copending United States patent application Serial No. 118,327. The aircraft is of Canard or "tail-first" layout with a fuselage 51, a pair of wings 52 and a foreplane 53, and it is powered by four gas turbine jet propulsion engines 54 mounted in pods at the rear of the aircraft. These engines are of the by-pass type and they are connected to supply by-pass air through conduits 55 incorporating non-return valves to a common duct 56 extending along the fuselage, and this duct has a branch 57 leading to an auxiliary nozzle 58 at the rear of the fuselage, the arrangement being the same as that of FIGURE 2.

The aircraft wings 52 are of substantially elliptical cross-section with rounded trailing edges as shown in FIGURE 6, and are formed with a number of shallow apertures extending along substantially the full span of each wing, these apertures being shaped and arranged to discharge air streams as thin layers over the surface of the wing. There are two such apertures 59, 60 located one on each side of the wing trailing edge and arranged to discharge rearwardly, a third aperture 61 adjacent aperture 60 but discharging forwardly, a fourth aperture 62 in wing under surface at about mid-chord and discharging rearwardly, and fifth and sixth apertures 63, 64 in the trailing edge between the two first-mentioned apertures, each arranged to discharge over the trailing edge in a direction away from the aperture 59 in the wing upper surface and towards the aperture 60 in the lower surface.

In cruising flight, air is supplied to the apertures 59, 60 and the streams discharged therefrom tend to close up the wake behind the rounded wing trailing edge. By varying the mass flows and velocities of these two streams relative to one another, the rear stagnation point can be moved to some extent around the trailing edge and the circulation and hence the wing lift varied.

When increased lift is required, for example, on take off and landing, the air supply to aperture 60 is discontinued, and air is supplied to apertures 61, 63, 64. The air streams from apertures 59, 63, 64 and 61 then reinforce one another (as indicated by the arrows in FIGURE 6), and the rear stagnation point is moved on to the under surface of the wing whereby a substantial increase in lift is obtained. Air is also discharged through aperture 62 and by varying the mass flow and velocity of this stream relative to the streams discharged from apertures 59, 63, 64, 61, the rear stagnation point can be stabilized at a desired position on the wing under surface between apertures 61 and 62. Provision is made for preventing flow breakaway at the wing leading edge, e.g. by suction or blowing in known manner.

The air for the various discharge apertures in the wings is taken from the duct 56 through branch pipes 65 (see FIGURE 5). These pipes incorporate valves operable by the pilot's controls to vary the air supplies and hence the lift on the wings.

The foreplane 53 is provided with trailing edge flaps 66 extending along substantially the full span thereof, and the duct 56 extends to the forward end of the aircraft where it is connected through manifolds 67 and branches 68 to long shallow rearwardly directed nozzles 69. These nozzles are similar to the jet flap nozzles of the previously described embodiment, and are shaped and arranged to discharge air streams over the flaps as "jet flaps." By turning the flaps 66 the jet sheets can be deflected and the equivalent of elevator control obtained.

It is to be noted that in this embodiment of the invention it will be necessary to vary the area of the auxiliary nozzle with the opening and closing of the valves controlling the supply of air to the various discharge apertures 59–64. Thus when air is being discharged through apertures 59 and 60, the area of auxiliary nozzle 58 must be greater than when air is being discharged through apertures 59, 61, 62, 63 and 64 so that the total flow area for discharge of the air is substantially unchanged and matching of the engines is unaffected. The control for the area of the auxiliary jet nozzle will therefore be linked in an appropriate sense to the pilot's controls for the valves in branch pipes 65. In addition a separate over-riding control will be provided to reduce the auxiliary nozzle area on take-off and landing for the purposes already explained.

It is to be noted that the term by-pass engine as used herein includes all gas turbine engines of the type producing two streams in parallel, one stream being a stream of air by-passing the combustion system. Thus the invention includes the use of engines with rear-mounted fans having blading mounted on the tips of the turbine blading and driven thereby, such engines being sometimes referred to as ducted fan or turbo-fan engines.

It might be supposed that the case of engine failure could be allowed for by pooling the exhausts of simple turbojet engines. However, it would be difficult or impossible to overcome the mismatching arising on the failure of an engine. Moreover the ducting leading to the jet flap nozzles would be carrying high temperature gases and this would lead to numerous complications. Finally, should an engine fail to light on starting or should flame-out occur in flight, fuel from that engine would be sprayed into the common exhaust duct, and as this would be at a high temperature, there would be a serious risk of explosion. By the use of by-pass engines in the manner described these difficulties can be avoided.

I claim:

1. An aircraft having wings; a plurality of gas turbine jet propulsion engines of the by-pass type; a plurality of rearwardly directed jet propulsion nozzles arranged to discharge clear of the wings; means connecting said engines to discharge their turbine exhaust gas streams through said nozzles; a common duct within the aircraft; means including non-return valves connecting said engines to supply at least part of their by-pass air streams to said common duct; further nozzle means in said wings; and means connecting said duct to supply air to said further nozzle means, said further nozzle means being shaped and arranged to discharge the air as long thin streams extending along the span of the wings.

2. An aircraft having wings; a plurality of gas turbine jet propulsion engines of the by-pass type; a plurality of rearwardly directed jet propulsion nozzles arranged to discharge clear of the wings; means connecting said engines to discharge their turbine exhaust gas streams through said nozzles; further nozzle means; and means connecting said engines to supply at least part of their by-pass air streams to said further nozzle means, said connecting means comprising a common duct, and means including non-return valves connecting said engines to said duct; at least part of said nozzle means being in said wings and being shaped and arranged to discharge the air as long thin streams extending along the span of the wings.

3. An aircraft according to claim 2 further comprising means for varying the flow area of said nozzle means relative to the flow area of said jet propulsion nozzles.

4. An aircraft according to claim 2 comprising means for varying the flow area of said nozzle means between a value matched to operation of all the engines at the design by-pass ratio and a lower value matched to operation of one less than the total number of engines at the design by-pass ratio.

5. An aircraft having wings; a plurality of gas turbine jet propulsion engines of the by-pass type; a plurality of rearwardly directed jet propulsion nozzles arranged to discharge clear of the wings; means connecting said engines to discharge their turbine exhaust gas streams through said nozzles; further nozzle means in said wings; auxiliary nozzle means; means for varying the flow area of said auxiliary nozzle means; a common duct within the aircraft; means including non-return valves connecting said engines to supply at least part of their by-pass air streams to said common duct; and means connecting said common duct to supply air to said further nozzle means and to said auxiliary nozzle means; said further nozzle means being shaped and arranged to discharge the air as long thin streams extending along the span of the wings.

6. An aircraft according to claim 5 wherein the flow area of the further nozzle means and the auxiliary nozzle means is matched to operation of all the engines at their design by-pass ratio and the flow area of the further nozzle means is matched to operation of one less than the total number of engines at their design by-pass ratio.

7. An aircraft according to claim 5 further comprising means connecting said engines to discharge part of their by-pass streams through said first-mentioned nozzles.

8. An aircraft according to claim 5 wherein said further nozzle means are shaped and arranged to discharge the air rearwardly from the rear of the wings as long thin sheets extending along the wing span, and further comprising jet deflectors at the rear of the wings operable to deflect the sheets downwardly from the rearward direction.

9. An aircraft according to claim 8 wherein said jet deflectors are constituted by trailing edge wing flaps, the further nozzle means being shaped and arranged to discharge said sheets over the upper surfaces of said flaps.

10. An aircraft having wings; a plurality of gas turbine jet propulsion engines of the by-pass type; a plurality of rearwardly directed jet nozzles arranged to discharge clear of the wings; means connecting said engines to discharge their turbine exhaust gas streams and part of their by-pass streams through said nozzles; means for constricting the flow area of said nozzles; further nozzle means in said wings; a common duct within the aircraft; means including non-return valves connecting said engines to supply the remainder of their by-pass air streams to said common duct; and means connecting said common duct to supply air to said further nozzle means; said further nozzle means being shaped and arranged to discharge the air as long thin streams extending along the span of the wings.

11. An aircraft according to claim 10 wherein said constricting means is operable to vary the flow area of said nozzles between a value matched to operation of all the engines at the design by-pass ratio and a lower value matched to operation of one less than the total number of engines at the design by-pass ratio.

12. An aircraft having wings; a plurality of gas turbine jet propulsion engines of the by-pass type; a plurality of rearwardly directed jet propulsion nozzles arranged to discharge clear of the wings; means connecting said engines to discharge their turbine exhaust gas streams through said nozzles; further nozzle means in said wings; a common duct within the aircraft; means including non-return valves connecting said engines to supply at least part of their by-pass air streams to said common duct; means connecting said common duct to supply air to said further nozzle means, said further nozzle means being shaped and arranged to discharge the air rearwardly from the rear of the wings as long thin sheets extending along the wing span; jet deflectors at the rear of the wings operable to deflect the sheets downwardly from the rearward direction; and means for varying the flow area of said further nozzle means.

13. An aircraft having wings; a plurality of gas turbine jet propulsion engines of the by-pass type; a plurality of rearwardly directed jet propulsion nozzles arranged to discharge clear of the wings; means connecting said engines to discharge their turbine exhaust gas streams through said nozzles; further nozzle means; and means connecting said engines to supply at least part of their by-pass air streams to said further nozzle means, said connecting means comprising a common duct, and means including non-return valves connecting said engines to said duct; at least part of said further nozzle means being in said wings and being shaped and arranged to discharge the air as thin spanwise-extending layers over the outer surfaces of the wings.

14. An aircraft according to claim 13 wherein the wings have rounded trailing edges, and the further nozzle means comprises nozzles located on each side of the trailing edge of each wing and arranged to discharge the air as thin spanwise-extending layers over the outer surface of the wings toward the trailing edge.

15. An aircraft according to claim 14 wherein said nozzle means comprises a further nozzle located adjacent the first-mentioned nozzle in the under-surface of each wing and arranged to discharge the air as a thin spanwise-extending layer over the outer surface of the wing away from the wing trailing edge.

16. An aircraft of Canard configuration having wings and a foreplane; a plurality of gas turbine jet propulsion engines of the by-pass type; a plurality of rearwardly directed jet propulsion nozzles arranged to discharge clear of the wings and foreplane; means connecting said engines to discharge their turbine exhaust gas streams through said nozzles; nozzle means in said wings; nozzle means in said foreplane; and means connecting said engines to supply at least part of their by-pass air streams to both of said nozzle means, said connecting means comprising a common duct and means including non-return valves connecting said engines to said duct; the nozzle means in said wing and said foreplane being shaped and arranged to discharge the air as long thin streams extending along the span of the wings and foreplane respectively.

17. An aircraft according to claim 16 wherein the nozzle means in the wings are shaped and arranged to discharge the air as thin spanwise-extending layers over the outer surface of the wings and the nozzle means in the foreplane are shaped and arranged to discharge the air rearwardly from the rear of the foreplane as long thin sheets extending along the span of the foreplane, and further comprising jet deflectors at the rear of the foreplane operable to deflect the sheets downwardly from the rearward direction.

References Cited in the file of this patent

UNITED STATES PATENTS

| | | |
|---|---|---|
| 2,912,189 | Pouit | Nov. 10, 1959 |
| 2,968,452 | Cook | Jan. 17, 1961 |
| 2,988,882 | Hollings | June 20, 1961 |

FOREIGN PATENTS

| | | |
|---|---|---|
| 729,879 | Germany | Dec. 3, 1942 |
| 768,072 | Germany | June 10, 1955 |